(12) United States Patent
Kim et al.

(10) Patent No.: US 8,824,345 B2
(45) Date of Patent: Sep. 2, 2014

(54) WAKE-UP APPARATUS AND WAKE-UP METHOD FOR LOW POWER SENSOR NODE

(75) Inventors: Ji-Eun Kim, Choongcheongbuk-do (KR); Ho-Yong Kang, Daejeon (KR); Nae-Soo Kim, Daejeon (KR); Cheol-Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1051 days.

(21) Appl. No.: 12/808,542

(22) PCT Filed: Oct. 24, 2008

(86) PCT No.: PCT/KR2008/006292
§ 371 (c)(1),
(2), (4) Date: Mar. 16, 2011

(87) PCT Pub. No.: WO2009/078575
PCT Pub. Date: Jun. 25, 2009

(65) Prior Publication Data
US 2011/0194471 A1     Aug. 11, 2011

(30) Foreign Application Priority Data
Dec. 17, 2007  (KR) .................. 10-2007-0132611

(51) Int. Cl.
*G08C 17/00* (2006.01)
*H04W 52/02* (2009.01)

(52) U.S. Cl.
CPC ............ *H04W 52/0235* (2013.01); *Y02B 60/50* (2013.01)
USPC ........ 370/311; 370/310; 370/432; 455/343.2; 455/574; 713/162

(58) Field of Classification Search
USPC ........................................ 370/311
See application file for complete search history.

(56) References Cited

U.S. PATENT DOCUMENTS 6,466,343 B1 * 10/2002 Lahat et al. ............... 398/82
6,493,824 B1 * 12/2002 Novoa et al. ............. 713/162

(Continued)

FOREIGN PATENT DOCUMENTS

| KR | 10-0509920 | 8/2005 |
| KR | 10-0587010 | 5/2006 |
| KR | 10-0665260 | 12/2006 |

OTHER PUBLICATIONS

International Search Report and Written Opinion mailed Mar. 12, 2009 in corresponding International Application No. PCT/KR2008/006292.

*Primary Examiner* — Ayaz Sheikh
*Assistant Examiner* — Hai-Chang Hsiung
(74) *Attorney, Agent, or Firm* — Staas & Halsey LLP

(57) ABSTRACT

Provided are a wake-up apparatus and wake-up method for a low power sensor node, and more particularly, to a wake-up apparatus and wake-up method for a low power sensor node, which can extend the battery life of the sensor node and minimize the amount of power consumed by an entire sensor network power by minimizing unnecessary power consumption of the sensor node. The wake-up apparatus for a low power sensor node includes: a wake-up signal detector receiving and detecting a wake-up signal of a sensor node; a wake-up radio frequency (RF) circuit unit filtering and amplifying the wake-up signal; and a wake-up baseband transducer detecting a wake-up address from the wake-up signal and comparing and verifying the wake-up address with a wake-up address that is provided from a server managing the sensor node. The wake-up apparatus outputs an interrupt signal for transmitting a sensing event of the sensor node or outputs a wake-up address of another sensor node in an area where the interrupt signal is to be sensed if errors are not detected when the wake-up address is verified.

10 Claims, 8 Drawing Sheets

(56) References Cited

U.S. PATENT DOCUMENTS

| | | |
|---|---|---|
| 2005/0122231 A1 | 6/2005 | Varaiya et al. |
| 2006/0112287 A1* | 5/2006 | Paljug .......................... 713/300 |
| 2006/0128349 A1* | 6/2006 | Yoon .......................... 455/343.2 |
| 2006/0187866 A1 | 8/2006 | Werb et al. |
| 2007/0058653 A1* | 3/2007 | Harris et al. .................. 370/432 |
| 2007/0147334 A1* | 6/2007 | Guthrie ........................ 370/349 |

* cited by examiner

WAKE-UP APPARATUS AND WAKE-UP METHOD FOR LOW POWER SENSOR NODE

CROSS-REFERENCE TO RELATED PATENT APPLICATION

This application claims the benefit of International Application No. PCT/KR2008/006292, filed Oct. 24, 2008, which claims the benefit of Korean Patent Application No. 10-2007-0132611, filed on Dec. 17, 2007, in the Korean Intellectual Property Office, the dislcosures of all of which are incorporated herein in their entirety by reference.

BACKGROUND OF THE INVENTION

1. Field of the Invention

The present invention relates to a wake-up apparatus and wake-up method for a low power sensor node, and more particularly, to a wake-up apparatus and wake-up method, which can extend the battery life of the sensor node and minimize the amount of power consumed by an entire sensor network by minimizing unnecessary power consumption of the sensor node.

The present invention is derived from a research project supported by the Information Technology (IT) Research & Development (R&D) program of the Ministry of Information and Communication (MIC) and the Institute for Information Technology Advancement (IITA) [2005-S-106-03, Technology Development of Sensor Tag and Sensor Node for RFID/USN].

2. Description of the Related Art

One of the main features of a ZigBee or ubiquitous sensor network is that it provides and controls a low power system. The ZigBee or ubiquitous sensor network uses frequency bands of 868.3 MHz, 915 MHz, and 2.45 GHz based on IEEE 802.15.4-2006 standard. Available channels, a transmission speed of data, and a transmission method can be classified according to the frequency bands used.

The ZigBee or ubiquitous sensor network is used in various fields of application including a home network system.

For example, the ZigBee or ubiquitous sensor network can be widely classified according to types of commercial sensors and fields of fire sensing in terms of forest fires, control and management of factory facilities, home network automation systems and observation of facilities, and management of patients in hospitals.

Conventionally, in order to reduce power consumption of a sensor node used in various ubiquitous sensor networks, research and development in terms of the implementation of a low power system that controls management of schedules, communication, data transmission, and the like by using software, have been carried out.

Such a low power system mainly has a function for reducing power consumption of the entire sensor network rather than a function for reducing or controlling power consumption of each sensor node, and thus difficulties arise when controlling and managing an individual sensor node and the low power system.

Herein, a method of controlling an individual sensor node is used to minimize power consumption in the ubiquitous sensor network. For example, research has been carried out into the development of a power source unit which can reduce power consumption of a power source unit used in the sensor node, and the provision of a new structure of wireless communication having a wireless communication function.

In order to develop the power source unit, research involving a solar battery for collecting energy has been carried out.

Also, methods have been proposed to reduce power consumption by simplifying a structure of a sensor node and enabling wake-up only when necessary while in a sleep state.

SUMMARY OF THE INVENTION

The present invention provides a wake-up apparatus and wake-up method for increasing energy efficiency of a low power sensor node by effectively using a battery power source of the sensor node.

The present invention also provides a method for waking-up a specific sensor node while in a sleep state when a wake-up address that is previously provided to the sensor node is the same as a wake-up address included in a wake-up signal received from a server.

According to an aspect of the present invention, there is provided a wake-up apparatus for a low power sensor node, including: a wake-up signal detector receiving and detecting a wake-up signal of a sensor node; a wake-up radio frequency (RF) circuit unit filtering and amplifying the wake-up signal; and a wake-up baseband transducer detecting a wake-up address from the wake-up signal and comparing and verifying the wake-up address with a wake-up address that is provided from a server managing the sensor node, and outputting an interrupt signal for transmitting a sensing event of the sensor node or outputting a wake-up address of another sensor node in an area where the interrupt signal is to be sensed if errors are not detected when the wake-up address is verified.

According to another aspect of the present invention, there is provided a wake-up method for a low power sensor node, the method including: receiving and detecting a wake-up signal receiving and detecting a wake-up signal of a sensor node; filtering and amplifying the received and detected wake-up signal; comparing and verifying an address with a wake-up address that is provided from a server managing the sensor node by detecting a wake-up address from the filtered and amplified wake-up signal; and outputting an interrupt signal for transmitting a sensing event of the sensor node or outputting a wake-up operation signal of another sensor node in an area where the interrupt signal is to be sensed if errors are not detected in the detecting operation of the address.

According to another aspect of the present invention, there is provided a low power sensor node, including: a wake-up apparatus unit detecting a wake-up address of an input signal and comparing and verifying the detected wake-up address with a wake-up address that is provided from a server, and outputting an interrupt signal for transmitting a sensing event or outputting a wake-up operation signal if errors are not generated when the address is verified; a power source apparatus management unit receiving the interrupt signal or wake-up operation signal and supplying power; and a main RF apparatus unit transmitting the sensing event and outputting the wake-up operation signal after the power is supplied.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, an exemplary embodiment according to the present invention will be described in detail with reference to the accompanying drawings.

The present invention relates to an ultra low power sensor node, which is an essential issue in a ubiquitous sensor network (USN) forming a foundation for realizing a ubiquitous society, operating for long hours without exchanging batteries.

A wake-up technology proposed by the present invention is a wake-up technology for waking-up a transmitting/receiving device in a sensor node by using a wireless signal only when the device is needed, and relates to a wake-up method and a wake-up system operation technology that can realize an ultra low power wireless transmit/receive circuit.

Figure 1:
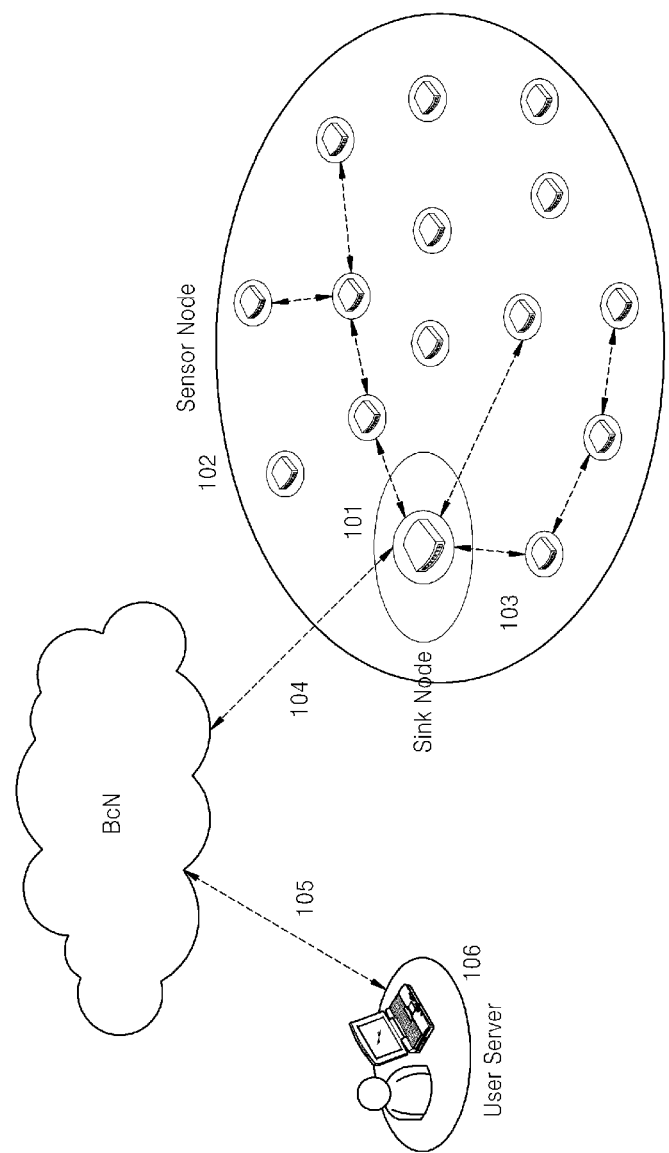
FIG. 1 is a view illustrating a structure of a ZigBee or ubiquitous sensor network to which a sensor node wake-up apparatus and a sensor node wake-up method according to the present invention is applied.

FIG. 1 is a view illustrating a structure of a ZigBee or ubiquitous sensor network to which a sensor node wake-up apparatus and a sensor node wake-up method according to the present invention is applied.

A ZigBee or ubiquitous sensor network includes a plurality of sensor nodes 102 that are in a sleep state or an operating state and a sink node 101 transmitting a wake-up address in order to wake-up a specific sensor node 102 from the sleep state and transmitting/receiving data to/from a sensor node 102 in the operating state.

Data received from the sensor node 102 is transmitted to a server 106 of a user through the sink node 101, and the server 106 sorts sensing information for the sensor node 102 and controls the sensor node 102.

The ubiquitous sensor network includes the sink node 101 and the sensor nodes 102, a broadband convergence network (BcN) environment 104, and the server.

The BcN transmits information collected in the sensor nodes 102 to the server 106 or transmits a wake-up address signal for waking-up the sensor node from the server 106 to the sensor node 102.

Figure 2:
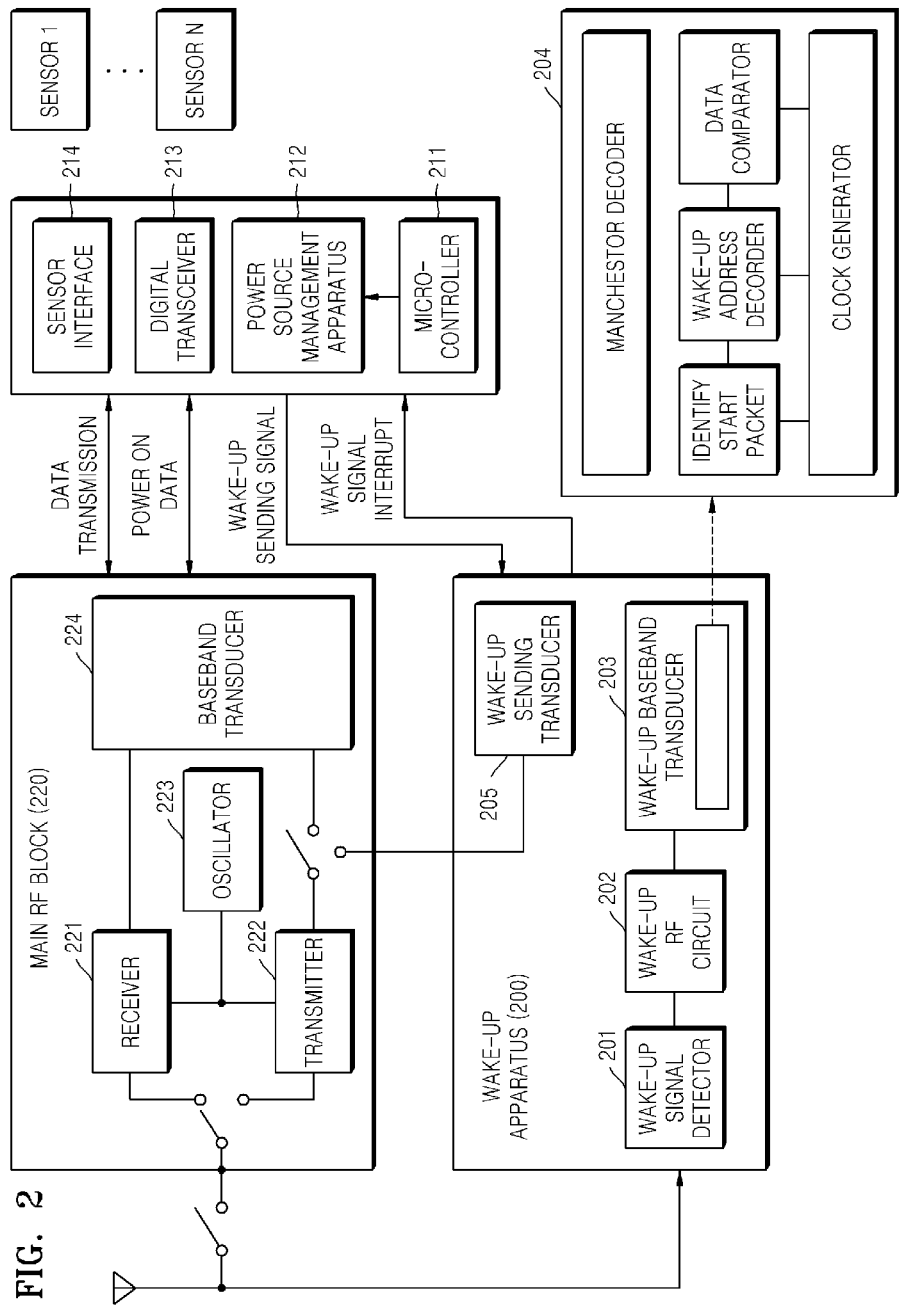
FIG. 2 is a view illustrating a structure of a sensor node wake-up apparatus for a low power sensor node in a sensor network according to an embodiment of the present invention.

FIG. 2 is a view illustrating a structure of a sensor node wake-up apparatus for a low power sensor node in a sensor network according to an embodiment of the present invention.

The sensor node wake-up apparatus 200 includes a wake-up signal detector 201 detecting a wake-up signal transmitted through the sink node 101 from the server 106, a wake-up radio frequency (RF) circuit 202 detecting linear signals by filtering, amplifying, and comparing the detected wake-up signal, and a wake-up baseband transducer 203 identifying a wake-up signal and an address in a received wake-up frame.

The wake-up baseband transducer 203, that has a structure including a wake-up digital circuit unit, includes a circuit generating an interrupt signal for extracting and inspecting the wake-up frame, extracting and inspecting the wake-up address, waking-up the sensor node, and also includes a separate central processing unit (CPU) interface.

A micro-controller 211 which received the wake-up operation signal of the sensor node powers on a digital transceiver 213, a sensor interface 214, a main RF block 220 through a power source management apparatus 212 and manages the operation of the sensor node.

The micro-controller 211 manages various pieces of sensing information collected through the sensor interface 214 during the operation of the sensor node.

The power source management apparatus 212 powers on the sensor node, so that the information collected in the sensor node 102 is transmitted/received to/from the server 106 through the main RF block 220.

Also, the sensor nodes 102 mutually transmit/receive information collected through the main RF block 220.

Figure 3:
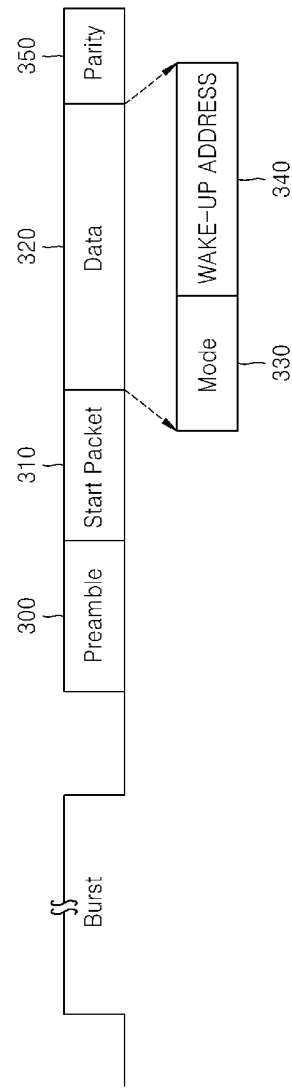
FIG. 3 is a view illustrating a wake-up frame for generating and providing a wake-up signal of a wake-up apparatus for a low power sensor node according to an embodiment of the present invention.

FIG. 3 is a view illustrating a wake-up frame for generating and providing a wake-up signal of a wake-up apparatus for a low power sensor node according to an embodiment of the present invention.

The server 106 can previously store address information of the related sensor node according to a user's application and can assign wake-up address information according to the number of stored sensor nodes.

The wake-up frame includes a premable field 300, a start packet field 310, a data (mode, wake-up address) field 320, and a parity field 350.

The premable field 300 is used to perform synchronization of the wake-up frame. The start packet field 310 comprised of 4 bits to 8 bits is used as a delimiter for the data field 320. The data field 320 includes a 2-bit mode field 330 and a 14-bit wake-up address field 340. The data field 320 is comprised of at least 16 bits.

A unicast wake-up mode operates if a unicast wake-up address value recorded in a register (that is, a register of a wake-up digital circuit unit) is in accordance with the wake-up address field 340 when the mode field 330 is "00". When the mode field 330 is "01", the wake-up address field becomes a multicast group address, and a multicast wake-up mode operates if a group address value recorded in the register is in accordance with the wake-up address field. A broadcast wake-up mode operates as a broadcast when the mode field 330 is "11" and when the wake-up address field 340 is All "1".

An error test of the data field 320 is performed on the data field 320 by a Manchester decoding method and a parity test after detecting the start packet field 310.

A burst signal with the maximum power is transmitted prior to the wake-up frame in order to receive the wake-up frame signal.

By performing signal detection and an error test on the start packet field 310, on the mode field 330 and wake-up address field 340 of the data field 320 to which the Manchester decoding method is applied, and on the parity field 350 in the wake-up frame, the probability that a false wake-up signal is generated is decreased.

The sensor node wake-up apparatus 200 wakes-up the sensor node 102 by finding and verifying the start packet field 310 and the data field 320 of the wake-up signal received from the server.

When a wake-up address included in the data field 320 is the same as a wake-up address that is previously provided, the sensor node 102 periodically transmits an ACK signal to the server.

The mode field 330 of the wake-up frame can be transmitted using a unicast method for waking-up a specific sensor node by detecting the wake-up address, a broadcast method for waking-up the entire node, or a multicast method for waking-up a plurality of sensor nodes.

Information of the wake-up frame can be transmitted using an ON/OFF Key (OOK) transmission method or a Manchester coding method.

Also, information of the wake-up address can be transmitted using the OOK transmission method or the Manchester coding method.

A method of identifying and providing a specific wake-up address to a wake-up structure according to an embodiment of the present invention can be formed in various ways, and it is not limited to the above.

Figure 4:
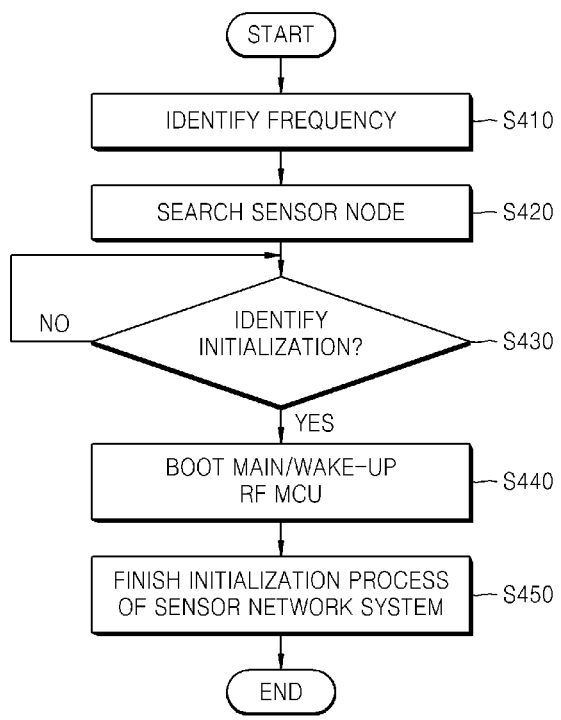
FIG. 4 is a flowchart of a process for initializing a wake-up apparatus of an individual sensor node and a sensor network according to an embodiment of the present invention.

FIG. 4 is a flowchart of a process for initializing a wake-up apparatus of an individual sensor node and a sensor network according to an embodiment of the present invention.

The server 106 searches for a transmission method and a frequency channel according to a user's application (S410).

The server 106 searches for a sensor node according to the user's application (S420), and a micro-controller 211 and a sensor node wake-up apparatus are booted through a main RF 220 of the corresponding sensor node wake-up apparatus (S440), and then, the wake-up system is initialized (S450).

At this time, the sensor node can perform wireless communication in a power-on state.

After the wake-up system is initialized, the server 106 provides information for operating a sensor network to the micro-controller and the sensor node wake-up apparatus, and provides a particular wake-up address for each sensor node.

The server 106 manages a wake-up function of the specific sensor node by using the provided wake-up address information.

The sensor node to which the wake-up address is provided is in a sleep state, and waits for a wake-up signal transmitted through the sink node 102 from the server 106.

Figure 5:
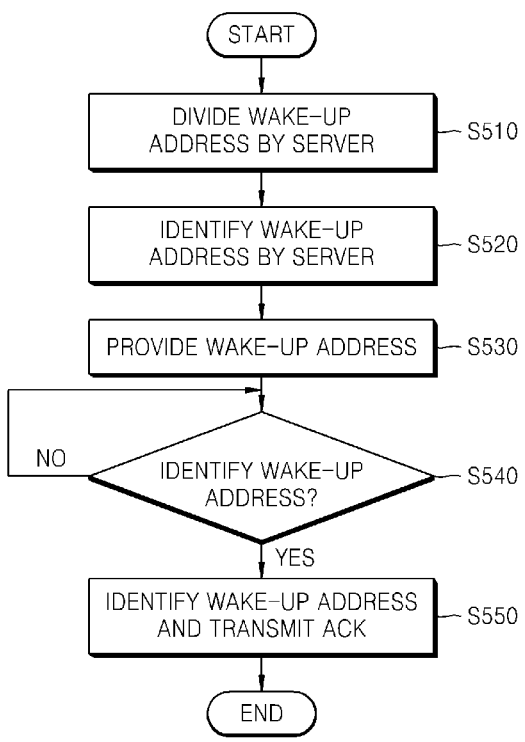
FIG. 5 is a flowchart of a process for providing a wake-up address in a sensor node wake-up apparatus according to an embodiment of the present invention.

FIG. 5 is a flowchart of a process for providing a wake-up address in a sensor node wake-up apparatus according to an embodiment of the present invention.

A server 106 divides wake-up addresses stored and assigned in a server according to a user's application (S510).

The server 106 primarily identifies whether wake-up address information that is divided in a register is in accordance with particular wake-up address information of the corresponding sensor node (S520).

The server 106 provides the wake-up address to the wake-up apparatus of each sensor node according to the user's application or a mode of the data field (S530).

In a system initialization operation of a sensor network and a sensor node, the sensor node 102 is provided to a wake-up digital circuit unit of a wake-up baseband transducer, and it is identified whether the wake-up address is divided in the same manner as the wake-up address of the corresponding wake-up apparatus (S540).

When the wake-up address is divided in the wake-up digital circuit in the same manner, an ACK signal for identifying the wake-up address is sent to the sink node 101 or the server 106, and the sink node 101 or the server 106 manages the corresponding information according to the ACK signal (S550).

Figure 6:
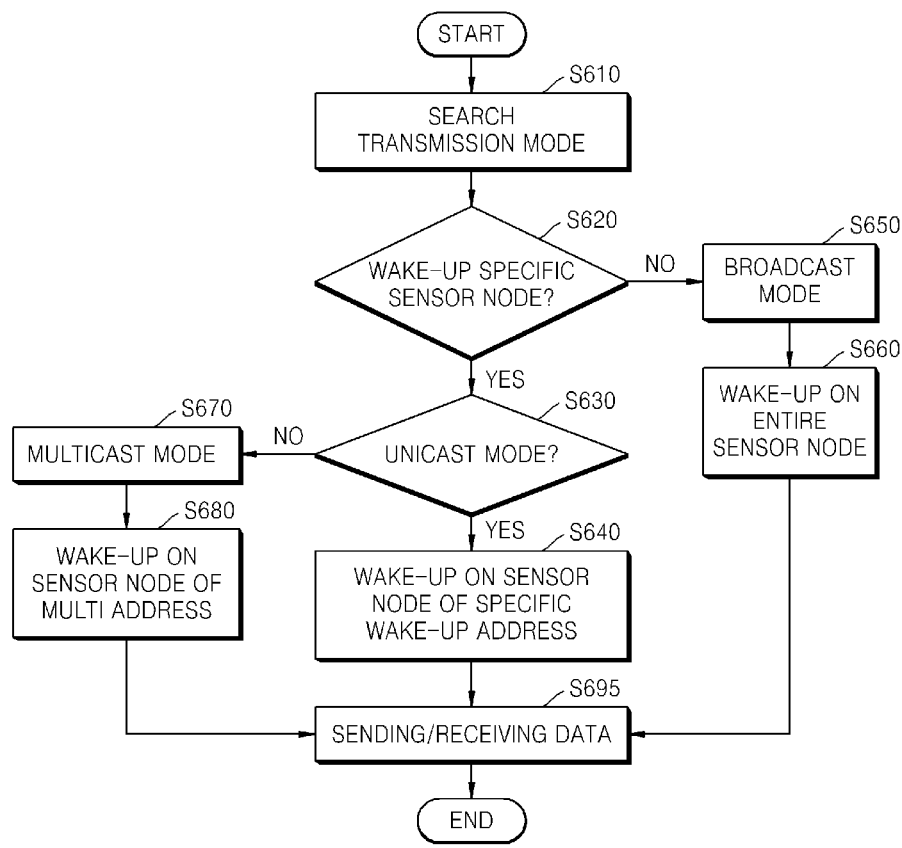
FIG. 6 is a flowchart of a process for transmitting information of a wake-up address to a wake-up apparatus of a specific sensor node through a sink node in a server according to an embodiment of the present invention.

FIG. 6 is a flowchart of a process for transmitting information of a wake-up address to a wake-up apparatus of a specific sensor node through a sink node in a server according to an embodiment of the present invention.

Figure 7:
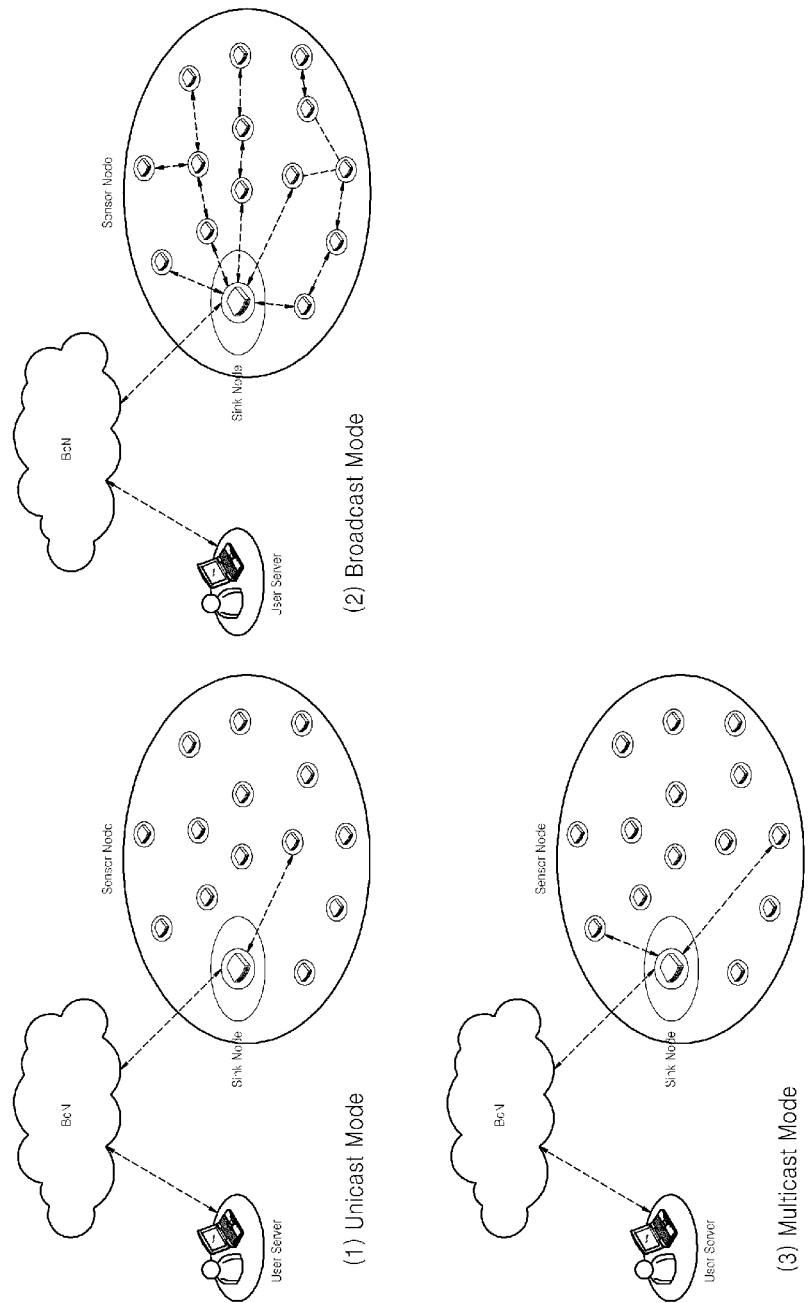
FIG. 7 is a view illustrating a transmission mode for transmitting a specific wake-up address to a sensor node wake-up apparatus through a sink node or sensor node according to an embodiment of the present invention.

FIG. 7 is a view illustrating a transmission mode for transmitting a specific wake-up address to a sensor node wake-up apparatus through a sink node or sensor node according to an embodiment of the present invention.

The wake-up address provided to the wake-up apparatus of each sensor node can be managed in various transmission modes according to a user's application.

The sensor node can perform wake-up management in a unicast transmission mode, a broadcast transmission mode, and a multicast transmission mode according to information of the wake-up mode.

The sensor node receives a wake-up signal through the sink node 101, and the sensor node wake-up apparatus drives the sensor node and the sensor network according to whether the information of the wake-up address included in the wake-up signal is in accordance with the wake-up address that is previously provided.

In operations for initializing the sensor network and the sensor node, the wake-up signal can be transmitted to the sink node or the sensor node through routing information stored in the sensor node.

<Unicast Transmission Mode>

A wake-up signal transmitted through the sink node 101 from a server is received in a specific sensor node wake-up apparatus, and the sensor node that received the wake-up signal powers on a microcontroller by identifying address information of the wake-up signal so as to enable transmitting/receiving a sensing event of the sensor node with the sink node 101.

<Broadcast Transmission Mode>

All sensor nodes are driven for a predetermined period or a predetermined by waking-up each sensor node in the entire sensor network in order to transmit/receive a sensing event of the sensor node to/from a sink node or sensor node.

<Multicast Transmission Mode>

Some sensor nodes selected in sensor nodes distributed in a sensor network are woken-up from a sleep state in order to transmit/receive a sensing event of the sensor node to/from a sink node or sensor node.

Figure 8:
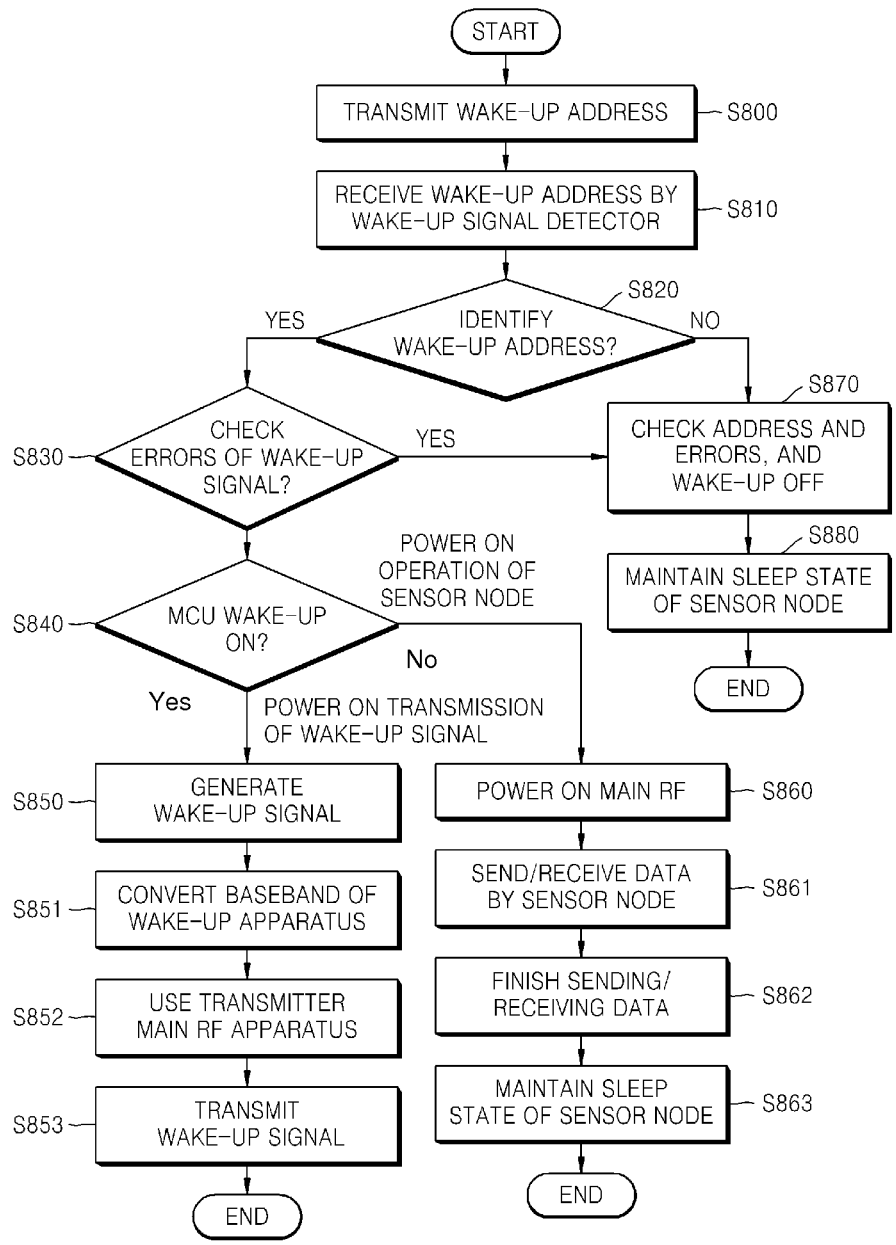
FIG. 8 is a flowchart of a process for operating a sensor node and transmitting a wake-up signal by transmitting a wake-up address of a sensor node wake-up apparatus according to an embodiment of the present invention.

FIG. 8 is a flowchart of a process for operating a sensor node and transmitting a wake-up signal by transmitting a wake-up address of a sensor node wake-up apparatus according to an embodiment of the present invention.

In an initialization operation of a sensor network and the sensor node, the initialization operation is finished by booting a wake-up system of the sensor node and the wake-up apparatus.

A server 106 receives a wake-up address that is previously divided by a user's application, via a wireless signal through a single antenna of the sensor node and stores the wake-up address.

A wake-up signal detector 201 of the sensor node wake-up apparatus receives a wake-up signal (S810), and passes through a wake-up RF circuit, and then identifies a wake-up address stored in a wake-up base band transducer (S820) and checks errors of the address and data (S830).

When the received wake-up address information is not the specific wake-up address information or when the errors of the address and data are checked, a wake-up signal is maintained in an off state to maintain a sleep state of the sensor node (S870).

On the other hand, when the received wake-up address information is the same as the specific wake-up address information and when the errors of the address and data are not checked, a micro-controller of a sensor node generates an ON signal and a wake-up signal as an external interrupt (S840).

When the sensor node is powered on, the sensor node supplies power to a main RF circuit apparatus 220 in a power source management apparatus 212 (S860), and sends the sensed information to the sink node 101 (S861).

When sending of the data is finished, the micro-controller 211 converts the sensor node from a wake-up ON state to a wake-up OFF state so as to maintain the sleep state of the sensor node (S863).

When the wake-up transmission signal is powered-on, the sensor node generates a wake-up signal (S850), and the generated wake-up signal is converted to an analog signal through a wake-up transmission transducer.

The analog signal is transmitted from a transmitter 222 of the main RF apparatus 220 (S853).

After transmitting of the wake-up transmission signal is finished, the sensor node maintains a sleep state in a wake-up OFF state.

The present invention relates to a wake-up apparatus and wake-up method for realizing an ultra low power sensor node operating for long hours without exchanging batteries, which is an essential issue in a ubiquitous sensor network (USN) forming a foundation for realizing a ubiquitous society. As illustrated in FIG. 2, the wake-up apparatus for a low power sensor node is a system for reducing power of the entire sensor node by allowing a micro-controller to control a main RF apparatus 220, a power source unit, and the like of the sensor node by generating an external interrupt after the wake-up signal is detected.

The wake-up apparatus transmits/receives a wireless signal through a sensor node and a single antenna, and transmits the wake-up signal by switching a transmitter 222 of a main RF apparatus 220 in the sensor node.

The wake-up apparatus uses a specific wake-up address in order to wake-up a specific sensor node when a wake-up signal is detected, and enables an individual wake-up operation when a wake-up address that is previously provided to the sensor node is in accordance with a wake-up address included in a wake-up signal received from a server.

The invention can be also embodied as computer readable codes on a computer readable recording medium. The computer readable recording medium is any data storage device that can store data which can be thereafter read by a computer system.

Examples of the computer readable recording medium include read-only memory (ROM), random-access memory (RAM), $CD_{13}$ ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, a wake-up apparatus and a wake-up method can minimize power consumption of a ubiquitous sensor network and a sensor node. The wake-up apparatus and the wake-up method transmits a wake-up address signal of a specific wake-up structure as a wireless signal, so that a sensor node and sensor network can be driven with an external interrupt signal by identifying and verifying the wake-up address signal. Accordingly, by minimizing unnecessary power consumption and noise, a battery of the sensor node can be efficiently used and power consumption of the sensor network can be minimized.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A wake-up apparatus for a low power sensor node, the apparatus comprising:
a wake-up signal detector receiving and detecting a wake-up signal of a sensor node;
a wake-up radio frequency (RF) circuit unit filtering and amplifying the wake-up signal; and
a wake-up baseband transducer detecting a wake-up address from the wake-up signal and comparing and verifying the wake-up address with a wake-up address that is provided from a server managing the sensor node, and outputting an interrupt signal for transmitting a sensing event of the sensor node or outputting a wake-up address of another sensor node in an area where the interrupt signal is to be sensed if errors are not detected when the wake-up address is verified,
wherein the wake-up signal comprises:
a start packet region indicating the received signal is a wake-up signal; and
a wake-up address information region comprising a mode information region storing a wake-up mode method of the sensor node and a region storing a wake-up address of the sensor node,
wherein start packet region information, indicating that the received signal is a wake-up signal, is output as a reversed value of 0 or 1 and has an output form of one of 2 bits, 8 bits, and 16 bits.

2. The apparatus of claim 1, further comprising:
a wake-up transmission transducer transmitting a wake-up operation signal of the wake-up baseband transducer to a main RF apparatus transmitting a sensing event of the sensor node.

3. The apparatus of claim 1, wherein a wake-up mode method of the sensor node comprises at least one of a unicast method, a broadcast method, and a multicast method.

4. The apparatus of claim 1, wherein the wake-up address is formed using an ON/OFF Key (OOK) transmission method or a Manchester coding method.

5. A wake-up method for a low power sensor node, the method comprising:
receiving and detecting a wake-up signal of a sensor node;
filtering and amplifying the received and detected wake-up signal;
comparing and verifying an address with a wake-up address that is provided from a server managing the sensor node by detecting a wake-up address from the filtered and amplified wake-up signal; and
outputting an interrupt signal for transmitting a sensing event of the sensor node or outputting a wake-up operation signal of another sensor node in an area where the interrupt signal is to be sensed if errors are not detected when the wake-up address is verified,
wherein the wake-up signal comprises:
a start packet region indicating the received signal is a wake-up signal; and
a wake-up address information region comprising a mode information region storing a selected wake-up broadcast method among wake-up broadcast methods of the sensor node one of which to be selected and used upon wake-up and a region storing a wake-up address of the sensor node, and wherein start packet region information, indicating that the received signal is a wake-up signal, is output as a reversed value of 0 or 1 and has an output form of one of 2 bits, 8 bits, and 16 bits.

6. The method of claim 5, further comprising:

initializing the sensor node located in the sensing area and a sink node which is transmitting the sensing event of the sensor node to the server for collecting the both node's location information.

7. The method of claim 5, wherein the wake-up mode method of the sensor node comprises at least one of a unicast method, a broadcast method, and a multicast method.

8. A low power sensor node comprising:

a wake-up apparatus unit detecting a wake-up address of an input signal and comparing and verifying the detected wake-up address with a wake-up address that is provided from a server, and outputting an interrupt signal for transmitting a sensing event or outputting a wake-up operation signal if errors are not detected when the wake-up address is verified;

a power source apparatus management unit receiving the interrupt signal or wake-up operation signal and supplying power; and a main RF apparatus unit transmitting the sensing event and outputting the wake-up operation signal after the power is supplied, wherein the wake-up signal comprises:

a start packet region indicating the received signal is a wake-up signal; and a wake-up address information region comprising a mode information region storing a selected wake-up broadcast method among wake-up broadcast methods of the sensor node one of which to be selected and used upon wake-up and a region storing a wake-up address of the sensor node, and wherein start packet region information, indicating that the received signal is a wake-up signal, is output as a reversed value of 0 or 1 and has an output form of one of 2 bits, 8 bits, and 16 bits.

9. The low power sensor node of claim 8, comprising:

a wake-up signal detector receiving and detecting an input wake-up signal of the sensor node;

a wake-up RF circuit unit filtering and amplifying the received and detected input wake-up signal; and a wake-up baseband transducer detecting a wake-up address from the wake-up signal and comparing and verifying the wake-up address with the wake-up address that is provided from a server managing the sensor node, and outputting an interrupt signal for transmitting a sensing event of the sensor node or outputting a wake-up address of the other sensor node in an area where the interrupt signal to be sensed if errors are not detected when the wake-up address is verified.

10. The low power sensor node of claim 9, further comprising:

a wake-up transmission transducer transmitting a wake-up operation signal of the wake-up baseband transducer to the main RF apparatus unit.

* * * * *